United States Patent
Beard

(10) Patent No.: US 7,221,926 B1
(45) Date of Patent: May 22, 2007

(54) SHORT RANGE RADIO

(75) Inventor: Paul Beard, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 291 days.

(21) Appl. No.: 10/147,839

(22) Filed: May 17, 2002

Related U.S. Application Data

(60) Provisional application No. 60/291,712, filed on May 17, 2001.

(51) Int. Cl.
 *H04B 1/16* (2006.01)
 *H04J 3/24* (2006.01)
 *H04L 12/28* (2006.01)

(52) U.S. Cl. ............... 455/334; 370/349; 370/389; 370/392

(58) Field of Classification Search ........... 455/323, 455/333, 41.2, 91, 73, 334; 370/349, 389, 370/392, 412, 474; 375/219, 220
See application file for complete search history.

(56) References Cited

U.S. PATENT DOCUMENTS

| 5,745,349 A | * | 4/1998 | Lemke | 361/818 |
| 5,850,526 A | * | 12/1998 | Chou | 709/247 |
| 6,366,622 B1 | * | 4/2002 | Brown et al. | 375/322 |
| 6,717,516 B2 | * | 4/2004 | Bridgelall | 340/572.1 |

* cited by examiner

*Primary Examiner*—Matthew Anderson
*Assistant Examiner*—Eugene Yun
(74) *Attorney, Agent, or Firm*—Marger Johnson & McCollom PC

(57) ABSTRACT

The present invention a method and apparatus for implementing a short range radio on a single chip. A radio, baseband, and link controller may be fully integrated within a single-chip comprising an area approximately one square centimeter. Through the integration of components upon a single package, cost and real estate savings may be provided in a baseband controller with improved performance.

15 Claims, 5 Drawing Sheets

SHORT RANGE RADIO

CROSS REFERENCE TO RELATED APPLICATIONS

The present application claims the benefit under 35 U.S.C. § 119 of U.S. Provisional Application Ser. No. 60/291,712 filed on May 17, 2001. Said U.S. Provisional Application Ser. No. 60/291,712 is hereby incorporated by reference.

FIELD OF THE INVENTION

The present invention generally relates to short range radios, and more particularly to a method and apparatus for implementing a short range radio on a single chip.

BACKGROUND OF THE INVENTION

Wireless communication protocols are providing a low cost and reliable alternative to hard-wire data transfer. Wireless communication protocols include BLUETOOTH, IEEE 802.11 and Home RF. The transfer of data across a wireless connection requires that devices within a wireless network are equipped with a baseband controller which may include a radio and baseband.

Typical utilization of wireless communication is through remote, battery-powered devices with a central or host device. For example, wireless data transfer may be utilized to transfer data between a personal digital assistant and a personal computer. Additional power consumption as required by the employment of a wireless data transfer causes a battery-powered device to have less operating time. Also, components necessary to implement a wireless connection may add cost and occupy additional space within the remote device. For example, adding a baseband controller to a cellular telephone may add cost for the consumer when purchasing a cellular phone and may cause the cellular phone to require a larger volume. Size and cost are typical factors which consumers tend to consider when purchasing remote battery-powered devices. For example, personal digital assistants may require a specific price point and size in order to be marketable.

Consequently, while wireless data transfer is desirable for consumers, manufacturers of devices employing wireless capability require that cost, space, and energy consumption are restrained to effectively market wireless devices. As a result, a baseband controller for wireless communication that does not require significant volume and energy usage while being manufactured in a cost-efficient manner is necessary.

SUMMARY OF THE INVENTION

Accordingly, the present invention is directed to a method and apparatus for implementing a short range radio on a single chip. In one embodiment of the invention, a radio and baseband may be fully integrated within a single-chip comprising an area approximately one square centimeter. Integration of a baseband controller within a single chip reduces cost for a manufacturer while providing enhanced performance with minimal power consumption requirements.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
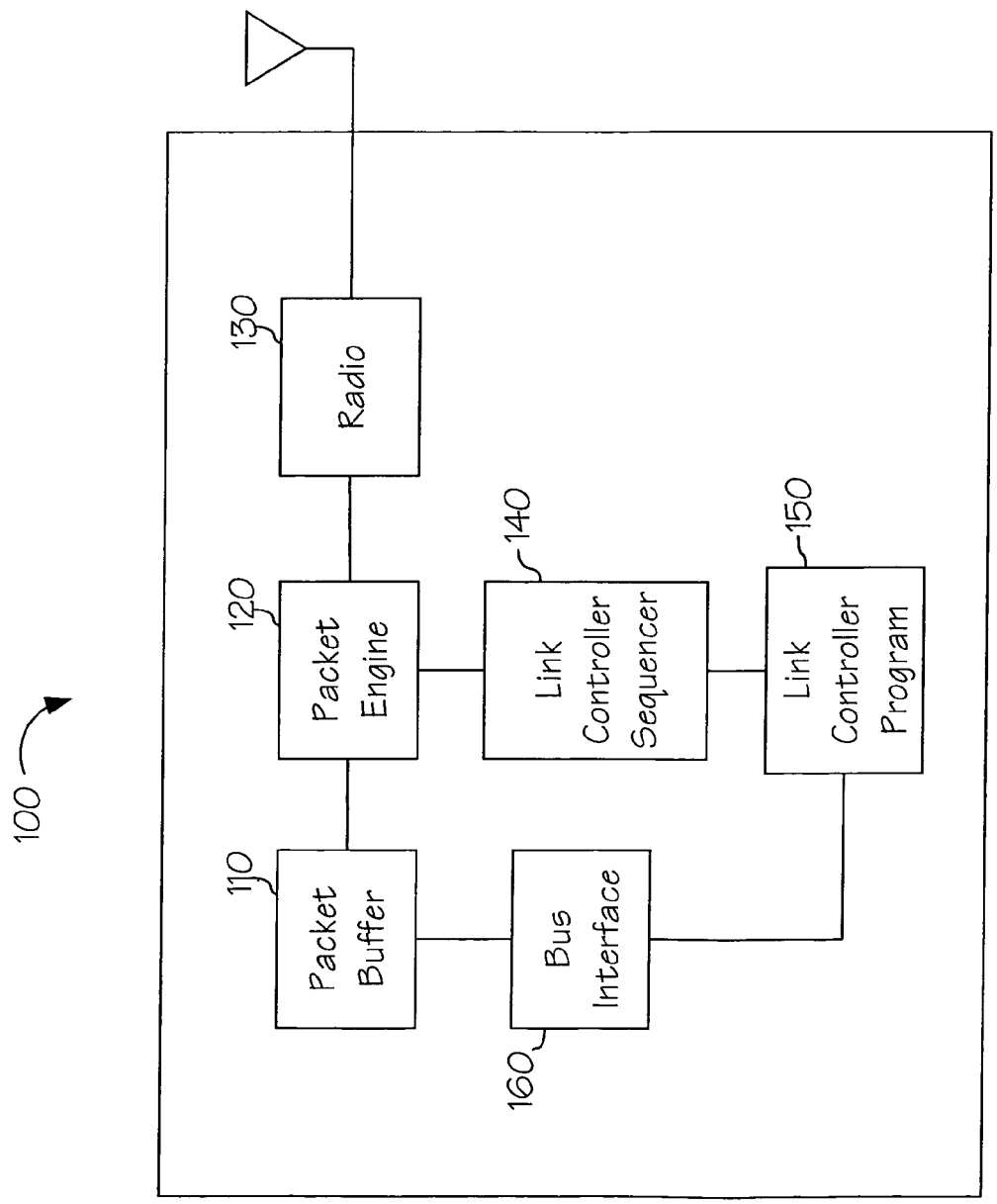
FIG. 1 depicts an embodiment of a block diagram of a baseband controller in accordance with the present invention.

Referring to FIG. 1, an embodiment of a block diagram of a baseband controller 100 in accordance with the present invention is shown. Baseband controller 100 may be utilized in host devices (hosts) to receive and transmit signals via a wireless connection with other wireless enabled devices. A wireless enabled device may refer to a device equipped with a baseband controller of the present invention that may allow short range wireless data transfer. An advantageous aspect of baseband controller 100 is the ability to implement controller 100 on a single chip. For example, baseband controller 100 may be incorporated into an eighty-one (81) ball thin ball grid array (10 by 10 by 1.2 millimeters) package. Integration of components within a single chip provides a low cost, highly efficient package that may reduce energy consumption and improve performance over baseband controllers known to the art.

In one embodiment of the invention, baseband controller 100 may be fully compliant with the Bluetooth specification V1.1. Additionally, baseband controller 100 may operate according to all of the power modes within a Bluetooth specification. Baseband controller provides flexibility in applications as it has an operating environment capable of functioning in a temperature range of −40° Celsius to +85° Celsius.

Figure 2:
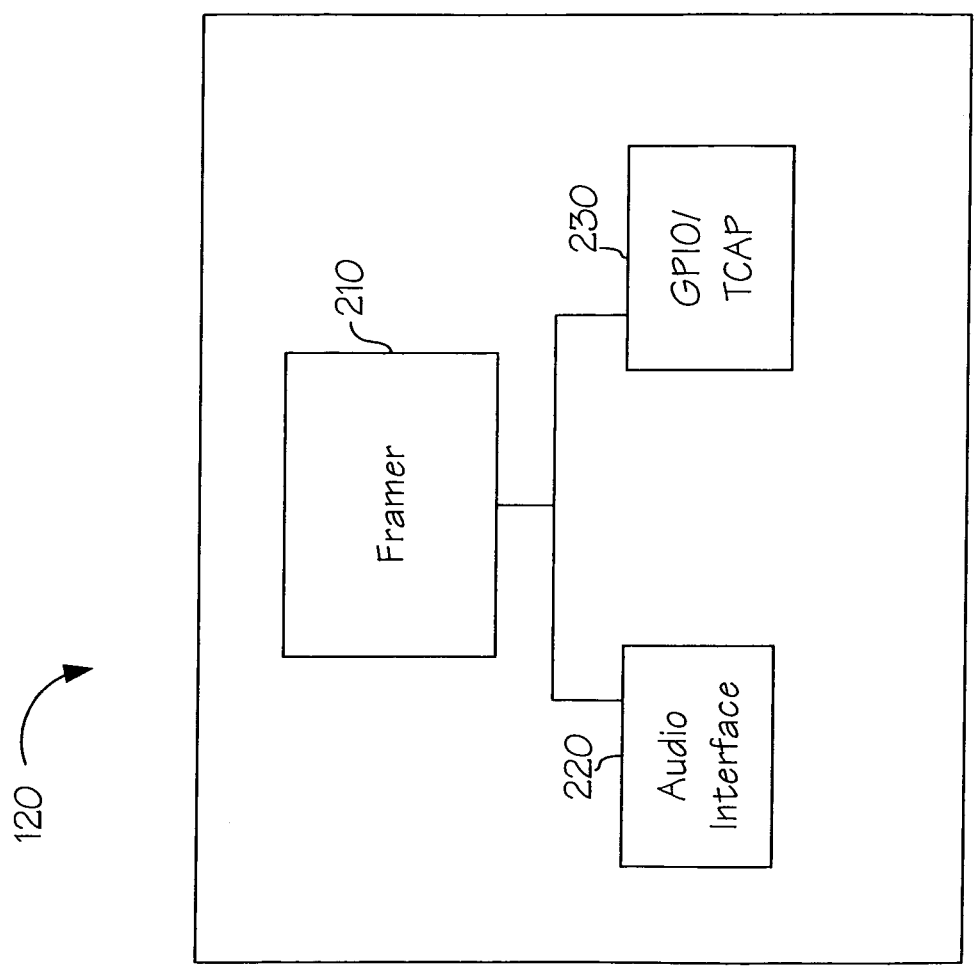
FIG. 2 depicts an embodiment of a block diagram of a packet engine in accordance with the present invention.

The baseband controller 100 may include a packet buffer 110, a packet engine 120, a radio 130, a link control sequencer 140, a link controller program 150 and a bus interface 160. Packet buffer 110 may be a block of memory, such as random access memory, that operates as a data interface between a host and packet engine 120. In an embodiment of the invention, packet buffer may be an 8 kilobyte integrated memory block to adequately meet transmission and reception requirements. Packet engine 120 may include a framer, an audio interface, and general purpose input/output (GPIO) pins as shown in FIG. 2.

Referring once again to FIG. 1, operation of baseband controller 100 ensures that transmitted packets may be written into packet buffer 110 by the host. From the packet buffer 110, the packets may be processed by link control sequencer 140 to be framed and transmitted by radio 130. Radio 130 may modulate and demodulate data between packet engine 120 and other wireless enabled devices. Received data by radio 130 is delivered to the framer of packet engine 120 which converts the data into packets. Link control sequencer 140 may process the packets and may write the packets to the packet buffer 110 to be read by the host.

Link controller program 150 may be a memory block, such as a block of random access memory, which may store link control sequencer code. In an embodiment of the invention, code may be loaded to the memory block by the host upon a power up of the host. The link control sequencer 140 may be an independent processor that implements link control functions. For example, link control sequencer may manage low-level packet traffic and may transfer data between the host and the packet engine 120. Bus interface 160 may provide address decoding, indirect addressing, link control sequencer control, and interrupt control.

An advantageous aspect of the baseband controller 100 of the present invention is that the packet engine 120 may be implemented in hardware and integrated within the baseband controller. The packet engine 120 and link control sequencer 140 may handle all Bluetooth link controller functionality in one embodiment of the invention. Packet engine 120 may utilize an 8-KB buffer to allow minimum interruption of a host processor running LMP or full stack software. This may reduce latency requirements and may reduce bottlenecks when the host processor is not available to service wireless transmission requirements.

An external host microprocessor may communicate with a link controller within the baseband controller through a set of registers, transport descriptors, and data buffers defined in the packet buffer and described in a transport protocol. Link manager code in a host microcontroller may write to control registers to manage the operation of the link controller. Link controller may report its activity to the link manager through status registers.

Referring now to FIG. 2, an embodiment of a block diagram of a packet engine 120 in accordance with the present invention is shown. Packet engine 120 may include a framer 210, audio interface 220 and general purpose input/output pins (GPIO) and capture timers (TCAP) 230. Framer 210 may control bit-wise operations. For example, framer 210 may retrieve packet header information from a link control sequencer and payload data from the packet buffer and processes this data for transmission by the radio. Framer 210 may also receive data from the radio and process the data into packets. The packets may be sent to the link control sequencer and packet buffer. Operation of the framer 210 may be controlled by the link control sequencer and may direct memory access (DMA) data to and from the packet buffer. Other functions performed by framer may include error correction, encryption/decryption, encoding/decoding, whitening/dewhitening, channel selection, correlation, slot synchronization and data clock recovery. An embodiment of a framer is shown and described in FIG. 3.

Turning to the operation of a packet engine, a link manager may send data payloads to the link controller and framer by copying the payload contents into an appropriate transmit packet buffer located in the packet buffer. Link controller may form packet header information and may divide the payload into appropriate packets. A framer may apply appropriate CRC, encryption, data whitening, and FEC before the packets are transmitted. When packets are received, a framer may perform decoding dewhitening, decryption, and CRC operations before loading the packets into packet RAM. Link control sequencer 140 may verify the packet heard and may notify a link manager that a payload was received via an interrupt.

Audio interface 220 of packet engine may refer to a slave mode pulse code modulated synchronous serial interface. Audio interface 220 may be utilized to transfer companded voice sample from an external audio codec or host. Advantageously, a single bi-directional stream of companded (Mu-Law or A-Law) voice data. The interface may operate in a synchronous mode and may support Short Frame Sync and Long Frame sync timing formats. In one embodiment of the invention, voice samples may be transparently sent and received by the interface 220 using isochronous Bluetooth packets. Frame sync (FCLK) and Bit (BCLK) sample timing may be provided by an external audio codec and PCM data may be transferred through PCMI and PCMO pins located on the chip of the baseband controller of the present invention.

GPIO 230 may refer to six (6) independently configurable input/output pins. Each pin of GPIO may be accessed and configured though GPIO data, GPIO configuration, and GPIO direction registers that may be defined in a transport protocol of the baseband controller of the present invention. Advantageously, the pins may be utilized to sense buttons or drive light emitting diodes (LEDs).

Capture timers (TCAP) may include four 8-bit input capture registers which may measure and record event times on two input pins. Additionally, registers may implement pulse-width encoding such as Miller encoding. Advantageously, capture timers may provide both rising and falling edge event timing capture. Each of the four capture registers may be individually enabled to provide interrupts. The interrupt may remain active until an external microprocessor reads a value in a status register. Subsequent interrupts may be held off until the value is read, and then asserted.

Figure 3:
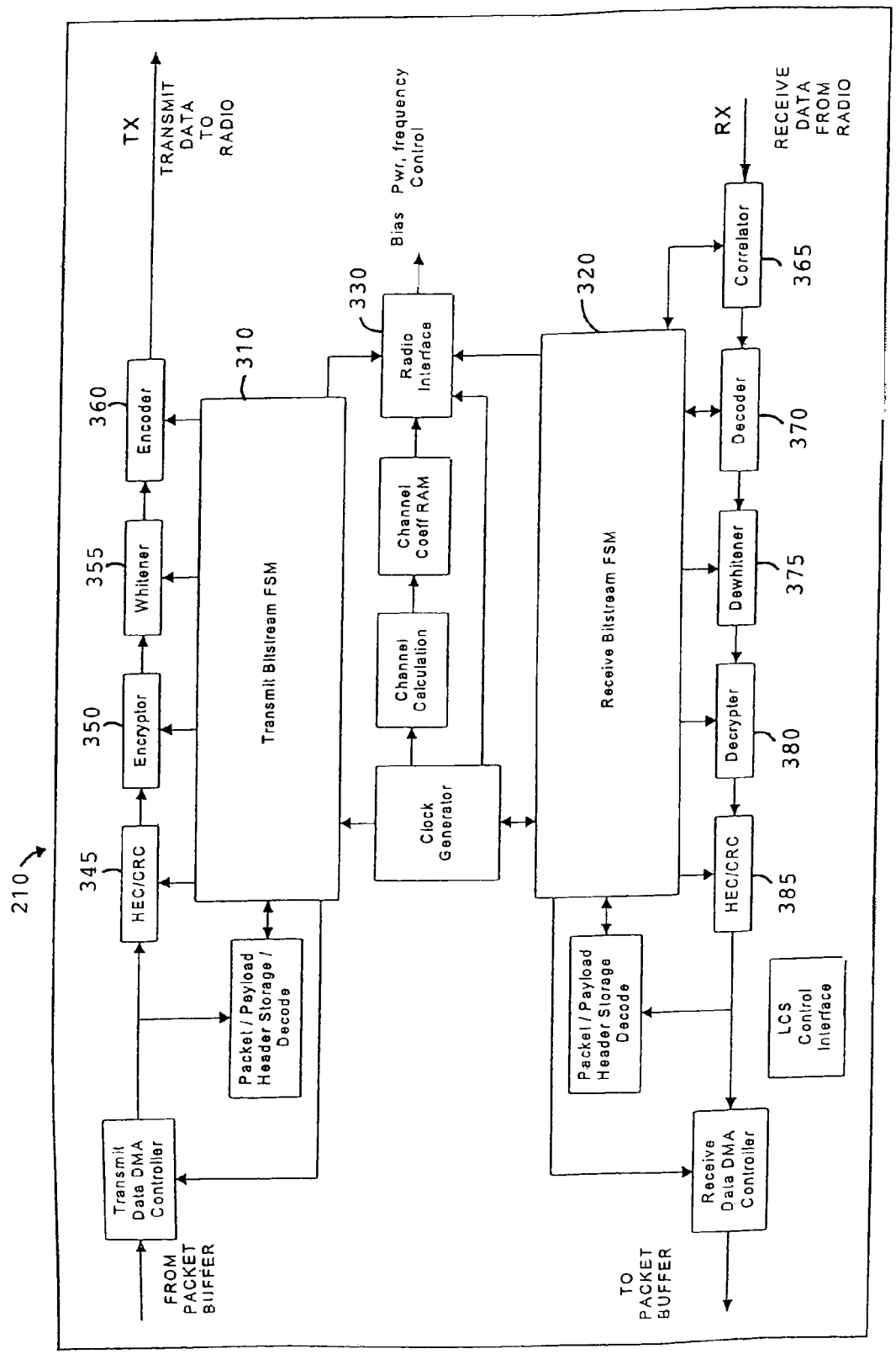
FIG. 3 depicts an embodiment of a framer in accordance with the present invention.

Referring now to FIG. 3, an embodiment of a framer 210 of the present invention is shown. The framer 210 may include a transmit bitstream finite state machine 310 and a receive bitstream finite state machine 320. Radio interface 330 provides control signals to the analog transmitter and receiver components. These control signals may control bias, power, and frequency parameters of the transmitter and receiver. The radio interface 330 also transmits status information to the framer. The transmit payload may undergo CRC generation 345, encryption 350, whitening 355, and encoding 360. The receive payload may undergo correlating 365, decoding 370, dewhitening 375, decryption 380, and CRC checking 385.

Figure 4:
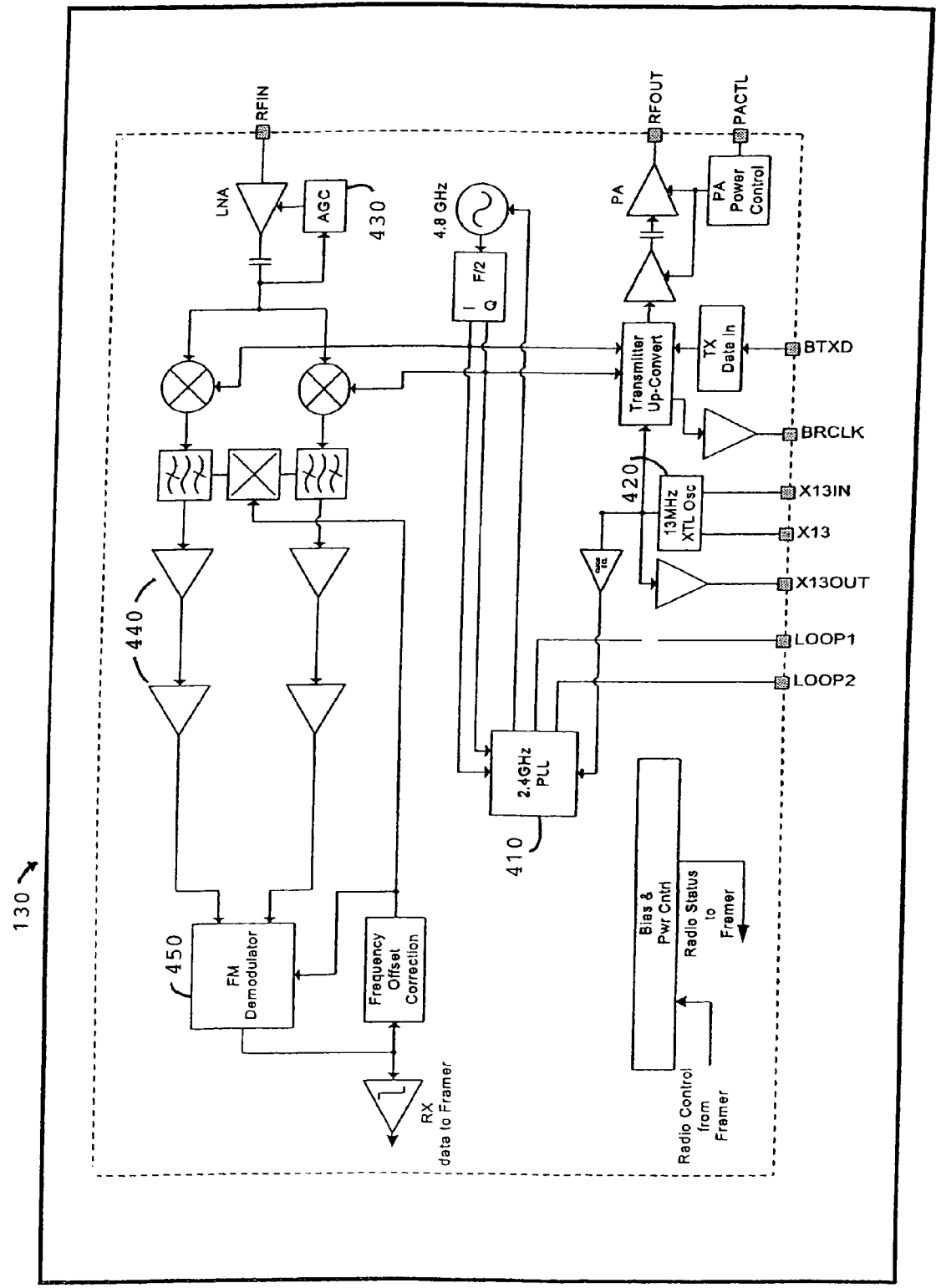
FIG. 4 depicts an embodiment of a radio in accordance with the present invention.

Referring now to FIG. 4, an embodiment of radio 130 of the baseband controller of the present invention is shown. In an embodiment of the invention, an integrated phase locked loop 410 and oscillator 420 are included within the radio 130 and do not require external components. The radio may employ a low intermediate frequency architecture. Additionally, radio 130 may utilize radio-frequency and baseband automatic gain control 430 along with integrated intermediate frequency filters 440 to achieve high performance in the presence of interference. An FM demodulator 450 and fast data slicer may also be integrated within radio 130. In an embodiment of the invention, baseband controller 100 may meet the specifications of Bluetooth Specification Version 1.1 and may be employed as a 2.4 GHz frequency hopping spread spectrum transceiver and includes a Guassian frequency shift keying (GFSK) modulator/demodulator.

A frequency synthesizer for radio 130 may employ a limited number of external components such as a reference crystal, loop filter resistors and loop filter capacitors. A transmitter portion of radio 130 may utilize a digital signal processed (DSP) based vector modulator to convert baseband data to an accurate Bluetooth GFSK modulated signal. Maximum output power supports class 2 (+4 dBm) and class 3 (0 dBm) operation. Additionally, class 1 (+20 dBm) operation may be supported with an external power amplifier. Power consumption may be controlled by employing DC power control features for transmitter, synthesizer and receiver functions to optimize the average current drain.

Figure 5:
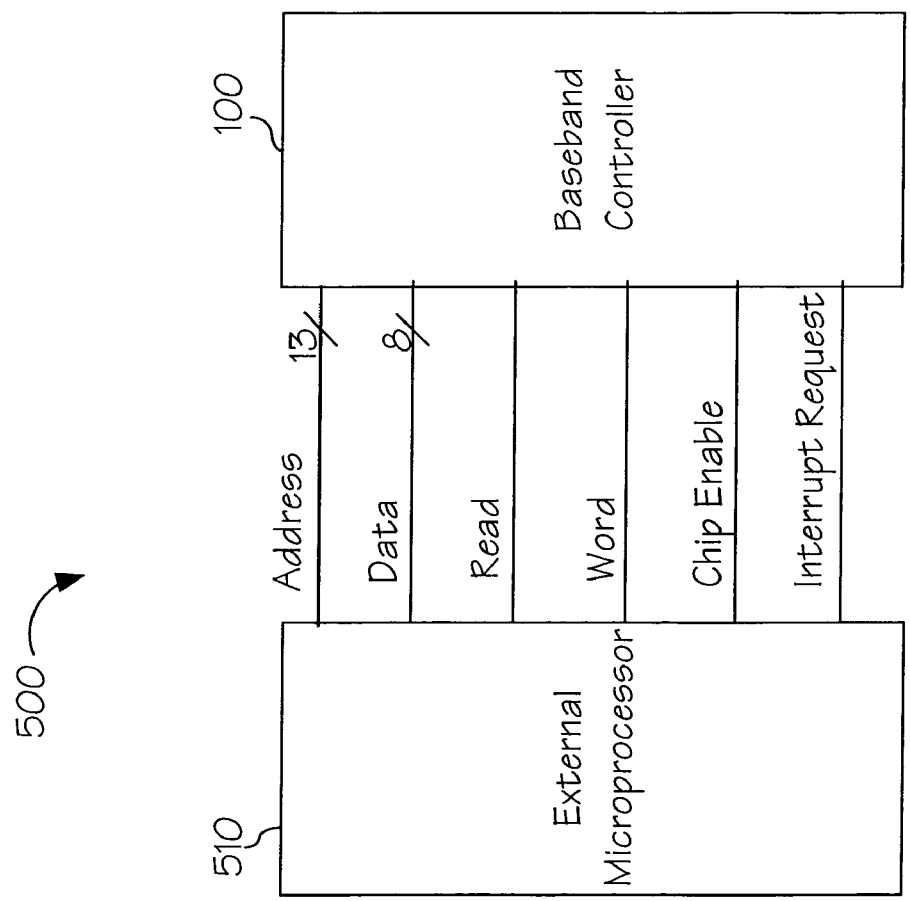
FIG. 5 depicts an embodiment of a block diagram representing an interconnection of a baseband controller with an external microprocessor in accordance with the present invention.

Referring now to FIG. 5, an embodiment of a block diagram representing an interconnection 500 of a baseband controller 100 with an external microprocessor 510 in accordance with the present invention is shown. An external microprocessor, included within a host device, may control the operation of a baseband controller 100. An external host microprocessor may communicate with a link controller within the baseband controller through a set of registers, transport descriptors, and data buffers defined in the packet buffer and described in a transport protocol. Link manager code in a host microcontroller may write to control registers to manage the operation of the link controller. Link controller may report its activity to the link manager through status registers.

The interconnection 500 of an external microprocessor 510 with baseband controller 100 may include two address lines for indirect addressing. Thirteen lines may be available for a low latency set-up using direct addressing. Eight data lines, a read line, work line, chip enable line, and interrupt request line may also be utilized in the control of the baseband controller 100.

As stated, a host device may access packet buffer memory and control registers through the bus interface. LCS code may be loaded into link controller program via the bus interface. Writing to the device is accomplished by asserting the chip enable line and write line. Data on data pins may be written to the location specified on the address pins. Reading data from the device may be accomplished by asserting the chip enable line and read line while forcing the write line high. Data from the memory Fi location specified by the address pins may appear on data pins.

In an embodiment of the invention, baseband controller 100 may be coupled to a host device. Baseband controller may provided wireless capability for the host device while the host device may provide processing power and memory for the controller 100. For example, a host microprocessor may be responsible for a Bluetooth stack down to and including the link manager while the Bluetooth link control, baseband, and radio frequency modulation is handled by the controller 100. In such a fashion, memory resources may be leveraged. Additionally, controller 100 may be coupled to a USB device to form a USB-Bluetooth dongle.

It should be understood by those with ordinary skill in the art that FIGS. 1–5 merely describe an embodiment of a single-chip baseband controller and the invention is not limited to the specific configurations as disclosed. Various implementations of single-chip baseband controllers may be employed by altering the configuration as described in FIGS. 1–5 that would not depart from the scope and spirit of the present invention.

It is believed that the system and method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A baseband controller capable of transferring data from a host device and other devices through a wireless link, the baseband controller comprising:
   a radio;
   a link control sequencer;
   a packet buffer to buffer payload data; and
   a packet engine configured to communicate directly with the radio, the link control sequencer, and the packet buffer, the packet engine including a framer, an audio interface, general purpose input/output (GPIO) pins, and capture timers, the framer configured to retrieve and process packet header information from the link control sequencer and the payload data from the packet buffer for transmission by the radio, the framer further configured to receive data from the radio, process the data into packets, and send the packets to the link control sequencer and the packet buffer, wherein the radio, the packet buffer, and the packet engine include components that are integrated within a single chip;
   where the GPIO pins comprising six independently configurable input/output pins configured to be accessed and configured through a GPIO data register, a GPIO configuration register, and a GPIO direction register that are defined in a transport protocol of the baseband controller.

2. The baseband controller of claim 1, the baseband controller further comprising:
   a link control program, the link control program including a memory block configured to store code for the link control sequencer, the link control sequencer including an independent processor that implements link control functions; and
   a bus interface between the link control program and the packet buffer, the bus interface further configured to provide address decoding, indirect addressing, link control sequencer control, and interrupt control.

3. The baseband controller of claim 1, the baseband controller configured to utilize a processing capability of a microprocessor of the host device to transfer data from the host device and other devices.

4. The baseband controller of claim 1, wherein the packet engine is implemented in hardware.

5. The baseband controller of claim 1, the radio configured to support class 2 (+4 dBm) and class 3 (0 dBm) operation.

6. The baseband controller of claim 1, the baseband controller configured to utilize a memory of the baseband controller to transfer data from the host device to the other devices through the wireless link.

7. The baseband controller of claim 1, the audio interface comprising a slave mode pulse code modulated synchronous serial interface.

8. The baseband controller of claim 7, the audio interface configured to transfer a companded voice sample from an external audio codec or host.

9. The baseband controller of claim 1, the radio comprising:
   a 2.4 GHz integrated phase locked loop; and
   a 4.8 GHz integrated oscillator.

10. The baseband controller of claim 1, the radio comprising:
    an automatic gain control configured to operate in a radio-frequency band and in a baseband; and an integrated intermediate frequency filter configured to operate with the automatic gain control to counteract interference, the intermediate frequency filter configured to operate on frequencies between the baseband and the radio-frequency band.

11. The baseband controller of claim 1, further comprising an external power amplifier configured to support class 1 (+20 dBm) operation of the radio.

12. A baseband controller capable of transferring data from a host device and other devices through a wireless link, the baseband controller implemented on a single chip, the baseband controller comprising:
 a radio;
 a link control sequencer, the link control sequencer including an independent processor that implements link control functions;
 a packet engine that is coupled directly to the radio, the link control sequencer, and a packet buffer, the packet buffer configured to buffer payload data;
 a link control program, the link control program including a memory block configured to store code for the link control sequencer; and
 a bus interface between the link control program and the packet buffer, the bus interface configured to provide address decoding, indirect addressing, link control sequencer control, and interrupt control;
 the packet engine comprising:
  an audio interface;
  general purpose input/output (GPIO) pins;
  capture timers; and
  a framer, the framer configured to retrieve and process packet header information from the link control sequencer and payload data from the packet buffer for transmission by the radio, the framer further configured to receive data from the radio, process the data into packets, and send the packets to the link control sequencer and the packet buffer; and
 the capture timers comprising four 8-bit input capture registers configured to measure and record event times on two-input pins.

13. The baseband controller of claim 12, the baseband controller configured to utilize a processing capability of a microprocessor of the host device to transfer data from the host device and other devices.

14. A baseband controller capable of transferring data from a host device and other devices through a wireless link, the baseband controller implemented on a single chip, the baseband controller comprising:
 a radio;
 a link control sequencer, the link control sequencer including an independent processor that implements link control functions;
 a packet engine that is coupled directly to the radio, the link control sequencer, and a packet buffer, the packet buffer configured to buffer payload data, the packet engine including an audio interface;
 a link control program, the link control program including a memory block configured to store code for the link control sequencer; and
 a bus interface between the link control program and the packet buffer, the bus interface configured to provide address decoding, indirect addressing, link control sequencer control, and interrupt control;
 the audio interface comprising a slave mode pulse code modulated synchronous serial interface configured to implement a bi-directional stream of voice data that is companded according to a µ-law scheme.

15. A baseband controller capable of transferring data from a host device and other devices through a wireless link, the baseband controller implemented on a single chip, the baseband controller comprising:
 a radio;
 a link control sequencer, the link control sequencer including an independent processor that implements link control functions;
 a packet engine that is coupled directly to the radio, the link control sequencer, and a packet buffer, the packet buffer configured to buffer payload data, the packet engine including an audio interface;
 a link control program, the link control program including a memory block configured to store code for the link control sequencer; and
 a bus interface between the link control program and the packet buffer, the bus interface configured to provide address decoding, indirect addressing, link control sequencer control, and interrupt control;
 the audio interface comprising a slave mode pulse code modulated synchronous serial interface configured to implement a bi-directional stream of voice data that is companded according to an A-law scheme.

* * * * *